United States Patent
Files et al.

(10) Patent No.: US 11,753,166 B2
(45) Date of Patent: Sep. 12, 2023

(54) PANEL ASSEMBLY FOR A VEHICLE

(71) Applicant: The Boeing Company, Chicago, IL (US)

(72) Inventors: Joe Files, Arlington, WA (US); Steven Ellis Rhynard, Mukilteo, WA (US); Daniel Paul Warren, Lake Stevens, WA (US); John Charles Rand, Lake Stevens, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/527,394

(22) Filed: Nov. 16, 2021

(65) Prior Publication Data
US 2023/0150672 A1 May 18, 2023

(51) Int. Cl.
*B64D 11/00* (2006.01)

(52) U.S. Cl.
CPC ........ *B64D 11/003* (2013.01); *B64D 11/0015* (2013.01)

(58) Field of Classification Search
CPC .............. B64D 11/003; B64D 11/0015; B64D 2011/0053; B64D 2013/003; B64D 2231/025; B64C 1/066
See application file for complete search history.

(56) References Cited

U.S. PATENT DOCUMENTS

| | | |
|---|---|---|
| 3,603,636 A | 9/1971 | Carella et al. |
| 5,441,218 A | 8/1995 | Mueller et al. |
| 5,456,529 A | 10/1995 | Cheung |
| 6,290,175 B1 | 9/2001 | Hart et al. |
| 7,802,826 B2 | 9/2010 | Schmitz et al. |
| 8,665,119 B2 | 3/2014 | Hashberger et al. |
| 8,876,050 B2 | 11/2014 | Wentland et al. |
| 9,745,064 B2 | 8/2017 | Balasubramanian |
| 2003/0141414 A1* | 7/2003 | Itakura ............. B64D 11/00154 244/118.5 |
| 2005/0029832 A1 | 2/2005 | Verduci et al. |
| 2007/0064964 A1* | 3/2007 | Cheung .................... H04R 7/04 381/323 |
| 2008/0078871 A1 | 4/2008 | Munson et al. |
| 2009/0243329 A1 | 10/2009 | Hustyi et al. |
| 2013/0290221 A1 | 10/2013 | Jindel |
| 2017/0058561 A1* | 3/2017 | Terry ........................ E05C 3/16 |

(Continued)

FOREIGN PATENT DOCUMENTS

WO 2017178078 A1 10/2017

*Primary Examiner* — Joshua J Michener
*Assistant Examiner* — Ka Chun Leung
(74) *Attorney, Agent, or Firm* — COATS & BENNETT, PLLC (57) ABSTRACT

An assembly for an interior of a vehicle with the assembly having a monument wall configured to mount to the interior of the vehicle. A panel is configured to mount to an overhead support structure adjacent to the monument wall. The panel includes a front side configured to face into the interior of the vehicle and an opposing back side. One or more latch assemblies are configured to connect the panel to the overhead support structure adjacent to the monument wall. The latch assemblies include a latch mounted to the back side of the panel, a track with one or more rails, a follower with an arm and a head with the head sized to engage with the track, and a pull mechanism to unlock the latch.

20 Claims, 10 Drawing Sheets

(56) References Cited

U.S. PATENT DOCUMENTS

| | | |
|---|---|---|
| 2017/0283060 A1* | 10/2017 | Papke ................ B64D 11/0023 |
| 2018/0179786 A1 | 6/2018 | Johnson |
| 2020/0269983 A1 | 8/2020 | Berkenhoff et al. |
| 2020/0339276 A1 | 10/2020 | Chengalva |
| 2021/0229794 A1 | 7/2021 | Vayssiere et al. |

* cited by examiner

PANEL ASSEMBLY FOR A VEHICLE

TECHNOLOGICAL FIELD

The present disclosure relates generally to the field of panel assemblies and, more specifically, to a panel assembly configured to have a limited movement range to connect and disconnect with a support structure.

BACKGROUND

Vehicles such as aircraft include panels that are connected to support structures at walls and ceilings within an interior space. The panels function to cover various components, such as but not limited to electrical components, electrical wiring, HVAC equipment, personal service unit equipment (e.g., emergency air system, lighting fixtures), and computer software equipment. In addition, the panels can also provide for an aesthetically pleasing appearance such that when positioned in the cabin area of the vehicle or other location where passengers are located.

The components that are covered by the panels may require periodic service. For example, various work is performed on the electrical components during maintenance work on the vehicle. This requires the panels to be disconnected from the support structure to allow for a technician to access the components. The panels should be mounted in a manner in which the technician can disconnect the panels in a straight-forward manner. Likewise, when the work on the components is completed, the panels should be configured to be re-connected to the support structure and repositioned to extend over the components.

As issue with some vehicles is the panels are located at monument walls that are mounted within the interior space of the vehicle. For example, a wall that separates adjacent passenger compartments may extend up to the ceiling in the interior space and be positioned in close proximity to a panel that is mounted to the ceiling. Thus, the panels should be configured to be connected to the support structure in a manner in which they can be disconnected within the small space and allow access to the components. Similarly, the panels should be configured to be moved in the small space and re-connected to the support structure when the work on the components is completed.

SUMMARY

One aspect is directed to an assembly for an interior of a vehicle. The assembly comprises a monument wall configured to mount to the interior of the vehicle. A panel is configured to mount to an overhead support structure adjacent to the monument wall. The panel comprises a front side configured to face into the interior of the vehicle, an opposing back side, and a perimeter edge that extends between the front and back sides. One or more latch assemblies are configured to connect the panel to the overhead support structure adjacent to the monument wall. The latch assemblies comprise: a latch mounted to the back side of the panel with the latch comprising a pair of jaws that are movable between a locked position and an unlocked position; a track comprising one or more rails; a follower comprising an arm and a head with the head sized to engage with the track; and a pull mechanism mounted to the back side of the panel and comprising an elongated shape with a first end connected to the latch and a second end positioned at the perimeter edge of the panel.

In another aspect, the latch is positioned in proximity to an outboard edge of the panel and the second end of the pull mechanism is positioned in proximity to an inboard edge of the panel.

In another aspect, the latch is positioned on the back side of the panel between the follower and an outboard edge of the panel.

In another aspect, the panel further comprises a speaker mounted in a central section within a perimeter edge and is exposed on the front side.

One aspect is directed to an assembly for an interior of a vehicle. The assembly comprises a monument wall configured to be mounted within the interior of the vehicle. A panel is configured to be mounted to an overhead support structure above the monument wall with the panel comprising a front side configured to face into the interior of the vehicle, an opposing back side, a first edge and a second edge with each of the first and second edges extending between the front and back sides. One or more latch assemblies are configured to connect the panel to the overhead support structure 121. Each of the latch assemblies comprises: a latch mounted to the back side of the panel; a translating assembly comprising a track and a follower with the follower configured to engage with the track; a pull mechanism mounted to the back side of the panel between the latch and the first edge and configured to move the latch from the locked position to the unlocked position. Each of the one or more latch assemblies is configured to unlock the latch and for the follower to translate along the track to slide the panel within an access space formed between the monument wall and the overhead support structure.

In another aspect, the latch is mounted to the panel in closer proximity to the second edge than the translating assembly.

In another aspect, the track is configured to connect to one of the panel and the overhead support structure and the follower is configured to connect to the other of the panel and the overhead support structure with the follower sized to remain engaged with the track to maintain the panel connected to the overhead support structure after the latch is released from the overhead support structure.

In another aspect, the track comprises first and second rails that are spaced apart to form a slot and with follower comprising a head sized to fit into the slot with the slot further comprising a closed end and an open end.

In another aspect, a recessed catch detent is positioned in one of the first and second rails and positioned in proximity to an open end of the track with the catch detent sized to engage with the head of the follower.

In another aspect, the panel comprises an opening and one of a speaker and an emergency air unit mounted at the opening.

In another aspect, an access space is formed between the monument wall and the panel with the access space comprising a height that is less than half a height of the panel.

One aspect is directed to a method of removing a panel from an overhead support structure that is positioned above a monument wall within an interior of a vehicle. The method comprises: actuating a pull mechanism that extends along a back side of the panel; disengaging a latch on the panel that is connected to the overhead support structure and vertically moving an edge of the panel downward away from the overhead support structure and towards the monument wall; maintaining the panel attached to the overhead support structure and sliding a follower along a track and sliding the panel relative to the overhead support structure within an access area formed between the overhead support structure and the monument wall; and sliding the follower out of the track and thereby removing the panel from the overhead support structure.

In another aspect, the method further comprises while the latch is disengaged and the panel is attached to the overhead support structure through the follower within the track, spacing the panel away from a front of the overhead support structure and accessing a closeout area formed within the overhead support structure.

In another aspect, the method further comprises maintaining the orientation of the panel relative to the overhead support structure while sliding the panel within the access area.

In another aspect, the method further comprises vertically moving the edge of the panel vertically downward away from the overhead support structure while a first section of the panel that is spaced away from the edge remains attached to the overhead support structure.

In another aspect, the method further comprises disengaging the latch and pivoting the panel about the follower.

In another aspect, the method further comprises maintaining the panel attached at two points to the overhead support structure while sliding the panel within the access area.

In another aspect, the method further comprises after disengaging the latch and while the panel remains attached to the overhead support structure through the follower and track, accessing a personal services unit component that is mounted on a back side of the panel.

In another aspect, the method further comprises maintaining the panel spaced away from the monument wall and sliding the follower along and out of the track.

In another aspect, actuating the pull mechanism comprises pulling a handle of the pull mechanism away from the edge of the panel and disengaging the latch.

In another aspect, the method further comprises engaging the panel to the overhead support structure with at least two of the latches.

The features, functions and advantages that have been discussed can be achieved independently in various aspects or may be combined in yet other aspects, further details of which can be seen with reference to the following description and the drawings.

DETAILED DESCRIPTION

Figure 1:
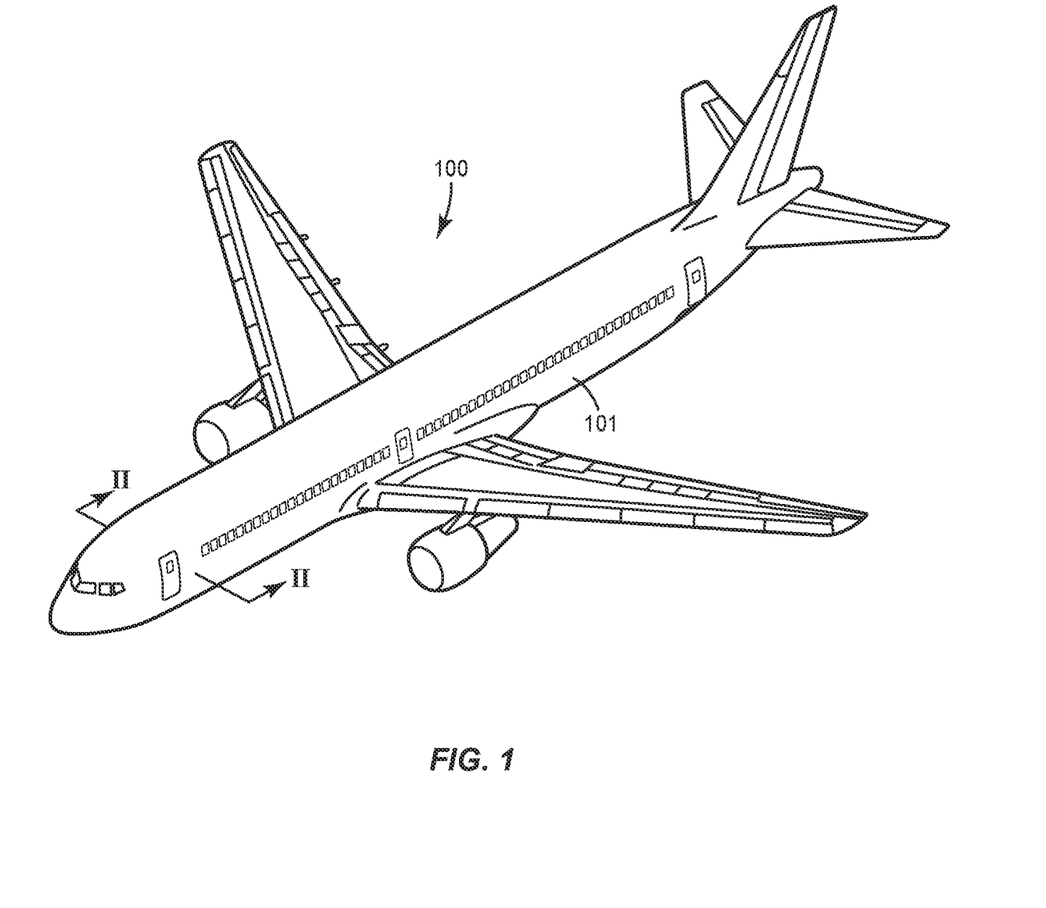
FIG. 1 is a perspective view of an aircraft.
Figure 2:
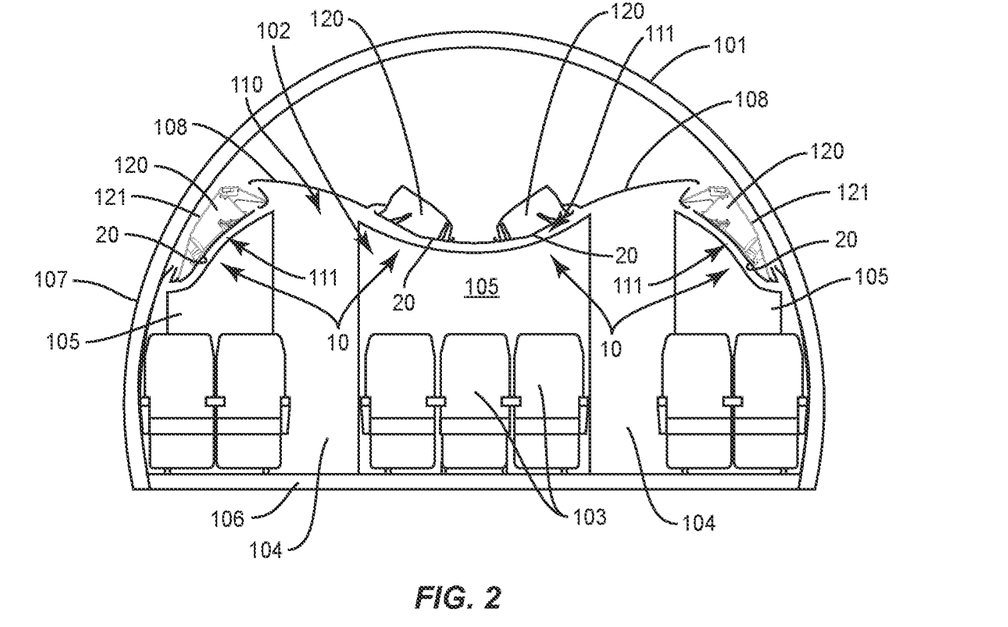
FIG. 2 is a schematic section view of a portion of the interior of the aircraft cut along line II-II of FIG. 1.

The panel assembly 10 can be used with a variety of different vehicles 100. One type of vehicle 100 is an aircraft 100 as illustrated in FIG. 1. The aircraft 100 includes a fuselage 101 configured to accommodate passengers and/or cargo. FIG. 2 is a partial cross-sectional, schematic view of an upper section of the fuselage 101. FIG. 2 illustrates a simplified version of a portion of the fuselage 101 that includes an interior space 102 configured to accommodate the passengers. The interior space 102 includes seats 103, aisles 104, and various other components for the passengers.

Monument walls 105 are fixedly mounted in the interior space 102. The monument walls 105 can include various structures, including but not limited to walls that separate different sections of the aircraft 100 or define a passenger space, storage closet for passenger cargo and clothing (e.g., jackets, briefcase), equipment closet, lavatory, galley, attendant work area, and serving bar. The monument walls 105 are attached to the structure of the aircraft 100, such as to one or more of the floor 106, walls 107, and ceiling 108. The attachment prevents the monument walls 105 from moving within the interior space 102.

The interior space 102 has an enlarged overhead area 110 that extends between the seats 103 and the ceiling 108. The overhead area 110 is particularly extended over the outboard seats 103 that are positioned towards the walls 107. Overhead bins that are mounted at the intersection of the walls 107 and ceiling 108 have been removed thus expanding the overhead area 110. The expansion provides a large amount of additional space for passengers in the outboard seats 103 and may allow them to stand in an upright position.

A closeout area 120 extends into the overhead area 110 from the walls 107 and/or ceiling 108. The closeout area 120 is sized for functional components of the aircraft 100, including but not limited to various electrical components and wiring, ventilation system components, and personal service unit elements such as speakers, and emergency air components. An overhead support structure 121 supports the functional components. The closeout area 120 is divided into sections that are accessed through panels 20. The panels 20 are part of a panel assembly 10 that is configured to provide access to the closeout area 120. The panel assemblies 10 are configured to secure to the overhead support structure 121 to prevent a passenger from accessing the closeout area 120. The panel assemblies 10 are further configured to be removed from the overhead support structure 121 to provide access to the closeout area 120, such as for a technician working on the aircraft 100.

The panel assemblies 10 can be positioned at various locations within the interior space 102. FIG. 2 includes an example with a first pair of panel assemblies 10 mounted over closeout areas 120 at the outboard edges of the aircraft 100. A second pair of panel assemblies 10 is mounted over closeout areas 120 in a central section of the aircraft 100. The panel assemblies 10 can open in different directions dependent upon their positioning within the interior space 102 and their positioning relative to one or more of the monument walls 105.

Figure 3:
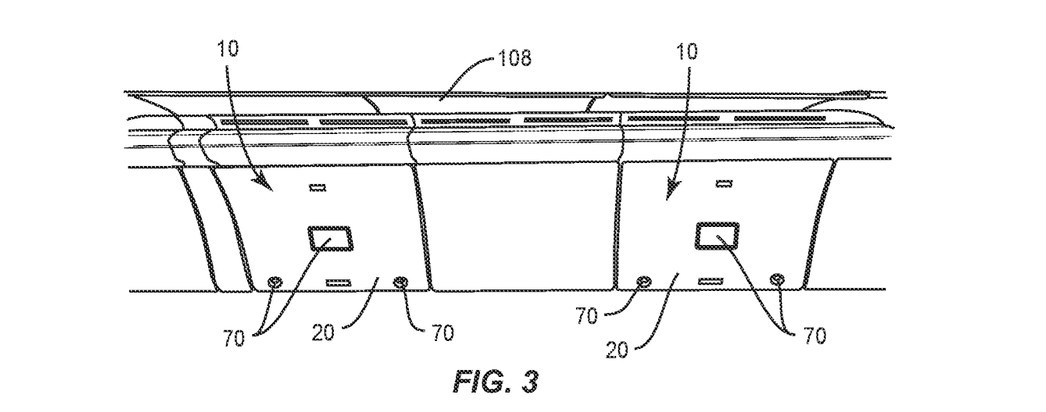
FIG. 3 is a perspective view of a pair of panel assemblies mounted to an overhead support structure.

In addition to functionally extending in front of the functional components, the panels 20 provide aesthetic features to the interior space 102. As illustrated in FIG. 3, the panels 20 are configured to match the overall appearance of the other features of the interior space.

The panel assemblies 10 extend over one or more monument walls 105 as illustrated in FIG. 2. The monument walls 105 can be in close proximity to the panels 20 with an access space 111 formed between the top of the monument walls 105 and the panels 20. The panel assemblies 10 are configured to be connected and disconnected from the overhead support structure 121 while in the limited access space 111.

Figure 3A:
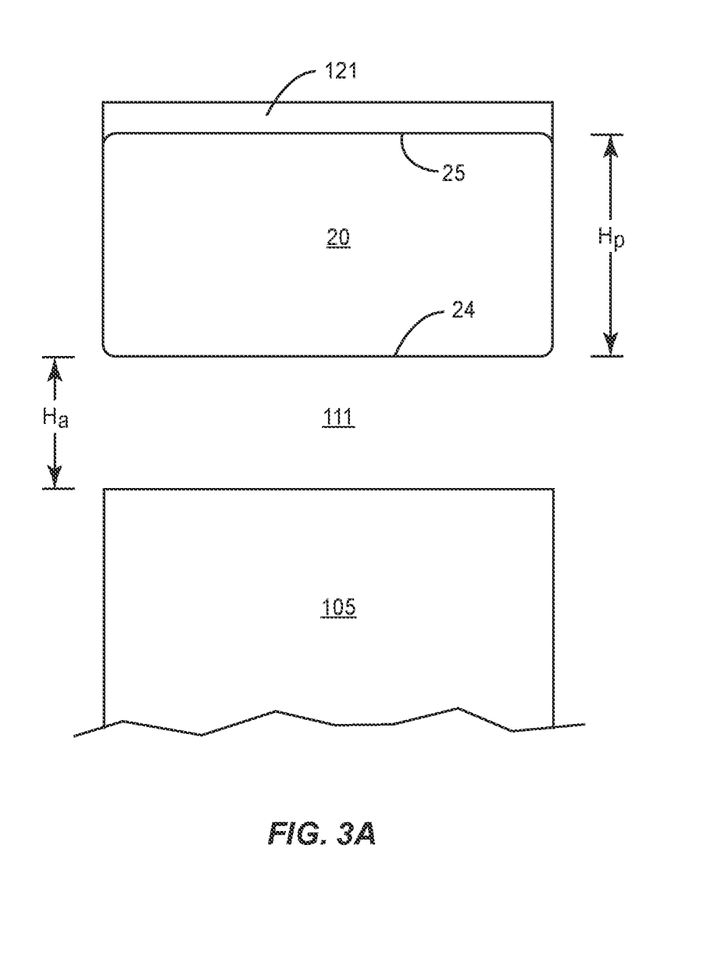
FIG. 3A is a schematic diagram of an access space formed between a monument wall and a panel.

FIG. 3A schematically illustrates the access space 111 having a height Ha formed between the monument wall 105 and the panel 20. The access space 111 is small relative to the panel 20. This reduced size complicates removal and reattachment of the panel 20 to and from the support structure 121. In one example, the access space height Ha is less than one-half (½) the height Hp of the panel 20 that is measured between the inboard and outboard edges 24, 25. In another example, the access space 111 has a height Ha that is less than one-fourth (¼) the height Hp of the panel 20. In one example as illustrated in FIG. 3A, the access space 111 has a uniform height and length. Other examples include the access space 111 having varying dimensions across the height and/or width. In one example, the height Ha of the access space is about 2 inches.

Figure 4:
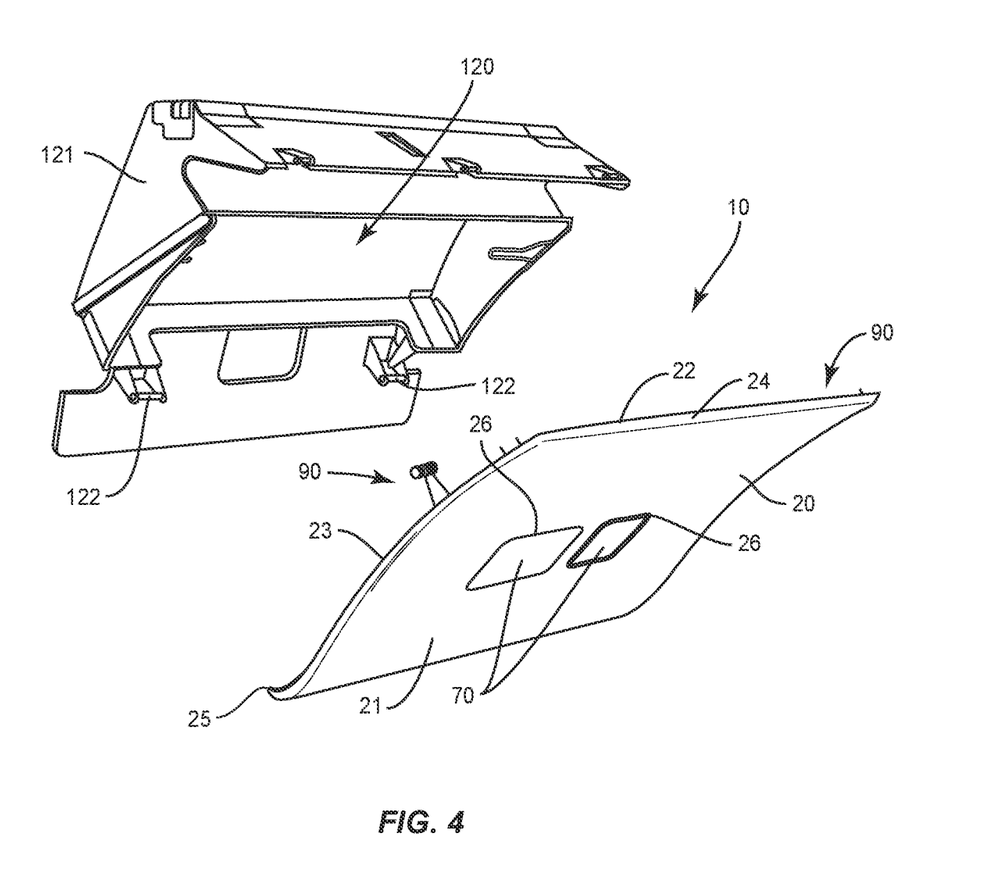
FIG. 4 is an exploded view of a panel and an overhead support structure.
Figure 5:
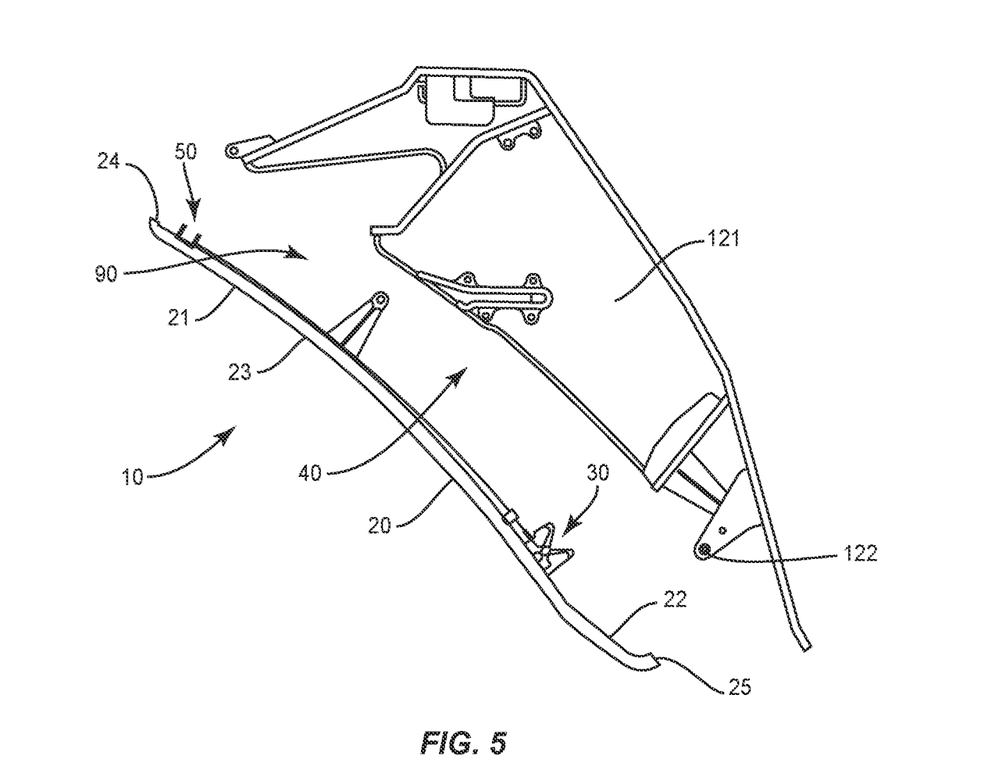
FIG. 5 is a side view of the panel and overhead support structure of FIG. 4.

FIGS. 4 and 5 illustrate a panel 20 and an overhead support structure 121. The panel 20 includes one or more latch assemblies 90 that removably connect the panel 20 to the overhead support structure 121. Each latch assembly 90 includes a latch 30, a translating assembly 40, and a pull mechanism 50. The one or more latch assemblies 90 function to connect the panel 20 to the overhead support structure 121. The one or more latch assemblies 90 also provide for translating the panel 20 along the overhead support structure 121. The movement to connect and disconnect the panel 20 from the overhead support structure 121 is limited to within the access space 111 that is available between the overhead support structure 121 and monument wall 105.

The example of FIGS. 4 and 5 includes a pair of latch assemblies 90 that secure the panel 20 to the overhead support structure 121. The latch assemblies 90 are spaced apart along opposing sides of the panel 20. Other examples include a single latch assembly 90, and three or more latch assemblies 90.

The panel 20 has a plate-like shape with a front side 21 that faces outward into the interior space 102 of the aircraft 100 when mounted to the overhead support structure 121. The panel 20 also includes an opposing back side 22 that faces into the closeout area 120. A perimeter edge 23 extends around the panel 20 and spans between the front and back sides 21, 22. The perimeter edge 23 includes an inboard edge 24 that is positioned towards a center of the vehicle 100 when mounted to the overhead support structure 121 and an opposing outboard edge 25. When the panel 20 is mounted to the overhead support structure 121, the front side 21 is visible from within the interior space 102 of the aircraft 100 and the back side 22 is not visible.

One or more passenger support unit (PSU) components 70 can be attached to the panel 20. Examples of components include but are not limited to speakers, lights (e.g., no smoking light, reading light), and components of an emergency oxygen system. FIG. 3 illustrates panels 20 that include multiple components 70 mounted in the panel 20. A first PSU component 70 is mounted towards a center of the panel 20 and is equipped for larger equipment, such as emergency oxygen canister and mask or a speaker for the public announcement (PA) system. Smaller PSU components 70, such as emergency lights are mounted towards the perimeter of the panel 20. FIG. 4 illustrates an example with two PSU components 70 mounted in the panel 20. In this example, the PSU components 70 are positioned in openings 26 within the panel 20. This provides for a portion of the PSU component 70 to be accessible to the passenger and/or positioned to be utilized as needed.

Figure 6:
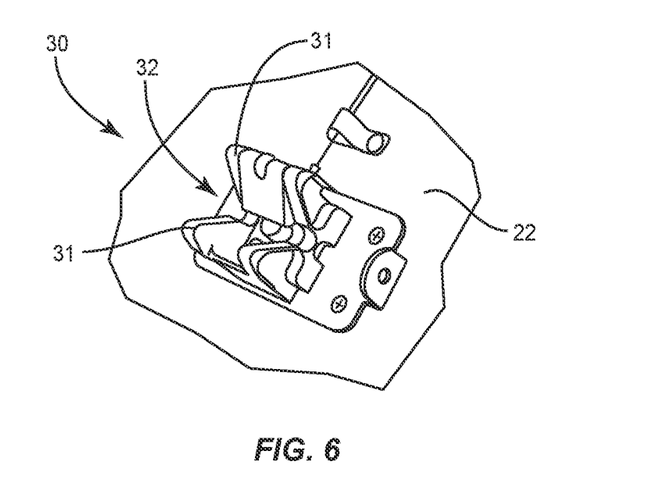
FIG. 6 is a perspective view of a latch mounted to a panel.

The latch 30 is mounted to the back side 22 of the panel 20. This position hides the latch 30 from view when the panel 20 is connected to the overhead support structure 121. As illustrated in FIG. 6, the latch 30 includes a pair of jaws 31 that are spaced apart to form an opening 32. The jaws 31 are adjustable relative to each other between a locked position and an unlocked position. In the locked position, the jaws 31 are connected to a strike member 122 on the overhead support structure 121.

In one example, one or both jaws 31 are pivotally mounted to the panel 20. The jaws 31 are biased by a biasing member towards the locked position. In one example, an over-center pawl maintains the locked position. A force applied to one or both jaws 31 moves the jaws 31 from the locked position to the unlocked position. In one example, the force simply overcomes the biasing force. In another example, the force causes the pawl to rotate thus moving one or both jaws 31 to the unlocked position.

The jaws 31 are further configured to return to the locked position when the panel assembly 10 is reconnected to the support structure 121. In one example, the shape of the surface of one or both jaws 31 contacts against and locks onto the strike member 122 when the jaws 31 are brought back into contact with the strike member 122.

Figure 7:
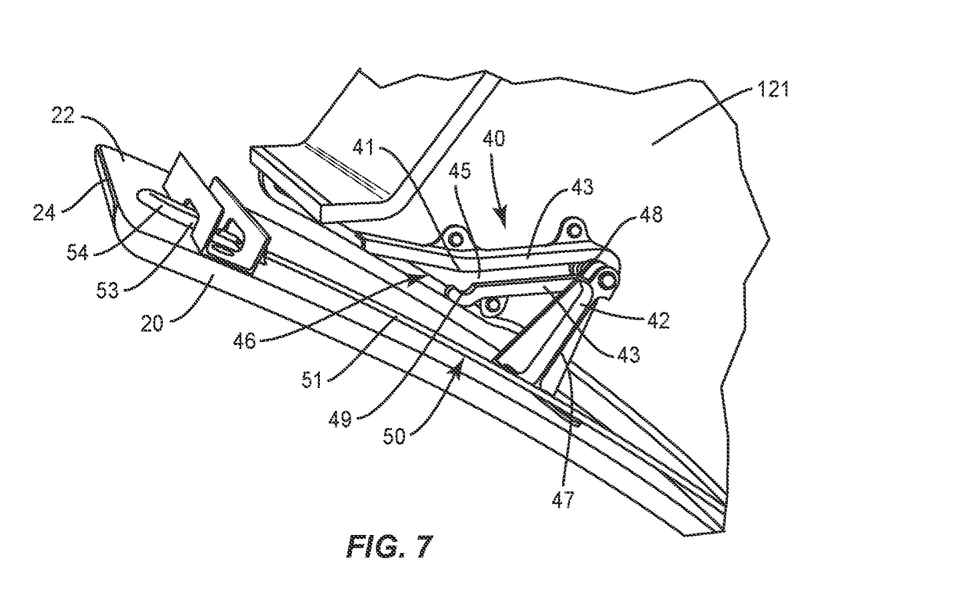
FIG. 7 is a side perspective view of a pull mechanism and a translating assembly.
Figure 8:
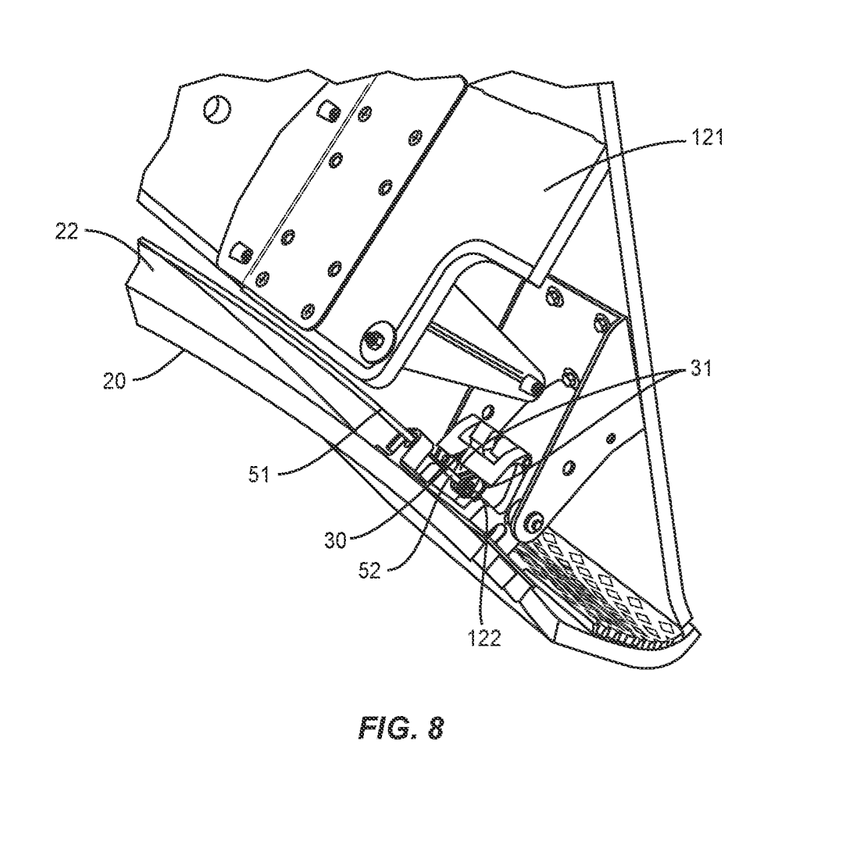
FIG. 8 is a side perspective view of a latch positioned on a panel and connected to a pull mechanism.

The pull mechanism 50 is positioned on the back side 22 of the panel 20 and is configured to move the latch 30 from the locked position to the unlocked position. The pull mechanism 50 includes an elongated shape that extends between the perimeter edge 23 of the panel 20 and the latch 30. The pull mechanism 50 includes an elongated member 51, such as but not limited to a wire, cable, string, and chain that includes a first end 52 connected to the latch 30 and a second end 53 at the perimeter edge 23. In one example as illustrated in FIG. 7, the second end 53 includes a handle 54 positioned at the inboard edge 24 of the panel 20. This positioning hides the handle 54 from view within the interior space 102 (see FIG. 3), but still provides access to a technician to actuate the pull mechanism 50 and release the latch 30.

The translating assembly 40 is configured to maintain the panel 20 connected to the overhead support structure 121 and also provide for translating the panel 20 relative to the overhead support structure 121. The translating assembly 40 is configured to provide for the movement of the panel 20 to be within the small access space 111.

As illustrated in FIG. 7, the translating assembly 40 includes a track 41 and a follower 42. These components are separated with one mounted on the panel 20 and the other mounted on the overhead support structure 121. FIG. 7 includes the track 41 mounted to the overhead support structure 121 and the follower 42 mounted to the panel 20, although other examples include the opposite attachment arrangement.

The track 41 includes one or more rails 43 that provide for mounting the follower 42. In one example as illustrated in FIG. 7, the track 41 includes a pair of rails 43 that are spaced apart and form an intermediate slot 45 sized to receive the follower 42. In another example (not illustrated), the track 41 includes a single rail 43 that supports the follower 42. The track 41 includes an open end 46 that faces outward away from the overhead support structure 121 to receive the follower 42. In one example as illustrated in FIG. 7, the track 41 is mounted to the overhead support structure 121 by mechanical fasteners that secure to an edge of the overhead support structure 121.

The follower 42 includes an outwardly extending arm 47 with a head 48 mounted at the distal end. The head 48 is sized to engage with and move along the track 41. In one example as illustrated in FIG. 7, the arm 47 extends outward from the back side 22 of the panel 20. The head 48 is positioned at the end of the arm 47 and is orientated inward to engage with the track 41. The head 48 includes a narrow neck that extends through the slot 45 and an enlarged tip that is wider than the slot 45. The relative shapes and sizes of the head 48 and slot 45 provide for the head 48 to be inserted into the track 41 at the open end 46 and to slide along the track 41 without detaching.

In the example of FIG. 7, the track 41 includes a detent 49 in one of the rails 43. The detent 49 catches the head 48 when the head 48 is moving towards the open end 46 and prior to moving outward from the open end 46 and releasing the panel 20 from the overhead support structure 121. The detent 49 can prevent an inadvertent removal of the panel 20 and provide for a user to maintain the connection with the overhead support structure 121.

Figure 9A:
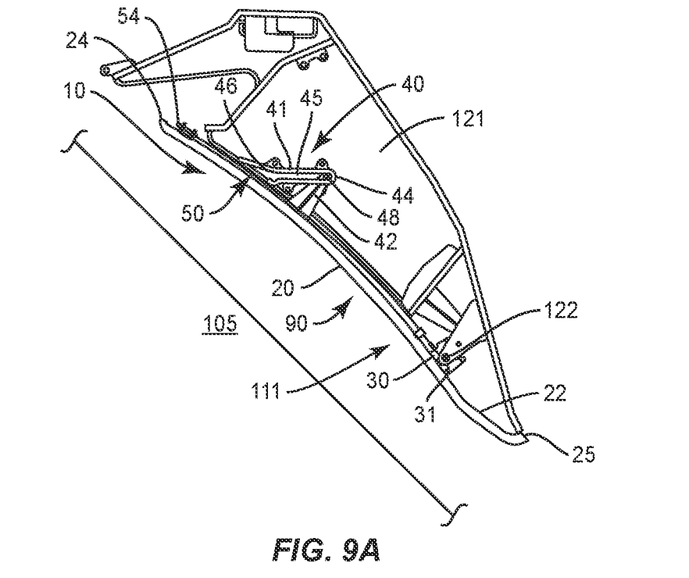
FIGS. 9A-9D are side views of a panel being removed from an overhead support structure.

FIGS. 9A-9D illustrate an example of the removal of the panel 20 from the overhead support structure 121. As illustrated in FIG. 9A, the panel 20 is connected to the overhead support structure 121. The jaws 31 of the latch 30 are engaged with the strike member 122 on the overhead support structure 121. The translating assembly 40 is positioned with the follower 42 within the track 41 and positioned towards a closed end 44 away from the open end 46. The panel 20 is orientated substantially against the overhead support structure 121 with the inboard edge 24 being inward and vertically above the outboard edge 25. In this example, the monument wall 105 is positioned vertically below the panel 20 with the small access space 111 in which to manipulate the panel 20 during removal.

The pull mechanism 50 extends along the back side 22 of the panel 20. The handle 54 is positioned in proximity to the inboard edge 24. This position provides accessibility to a user, but also shields the handle 54 from view within the interior space 102. This prevents and/or limits tampering by a passenger and also does not deter from the aesthetic appearance of the interior space 102.

Figure 9B:
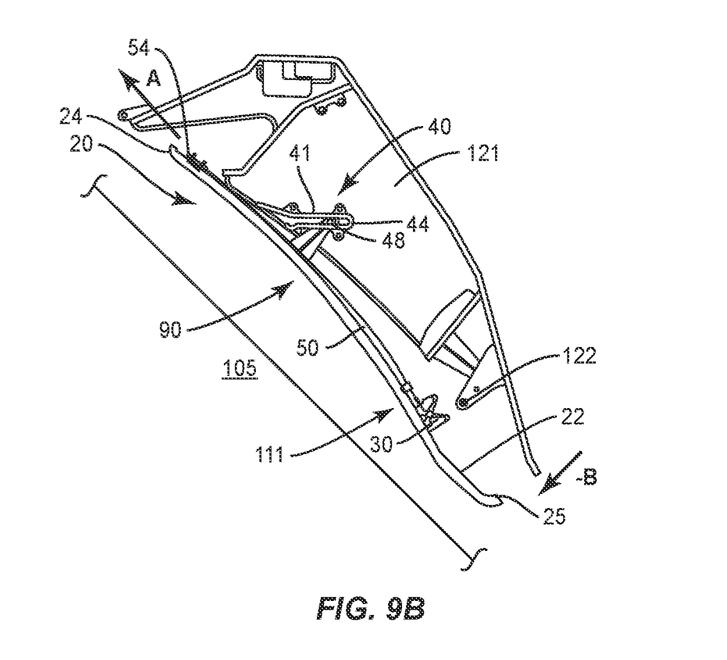

As illustrated in FIG. 9B, a force applied in the direction of arrow A to the pull mechanism 50 causes the latch 30 to move to the unlocked position. This in turn releases the latch 30 from the strike member 122 and thus from the overhead support structure 121. This disengagement of the latch 30 also moves the outboard edge 25 of the panel away from the overhead support structure 121 as shown by arrow B. Once the latch 30 is disconnected, the panel 20 can pivot about the head 48 of the follower 42 that is positioned in the track 41. Further, the head 48 may move along the track 41 a limited distance away from the closed end 44. The panel assembly 10 remains attached to the overhead support structure 121 through the translating assembly 40 and remains within the access space 111 and away from the monument wall 105.

Figure 9C:
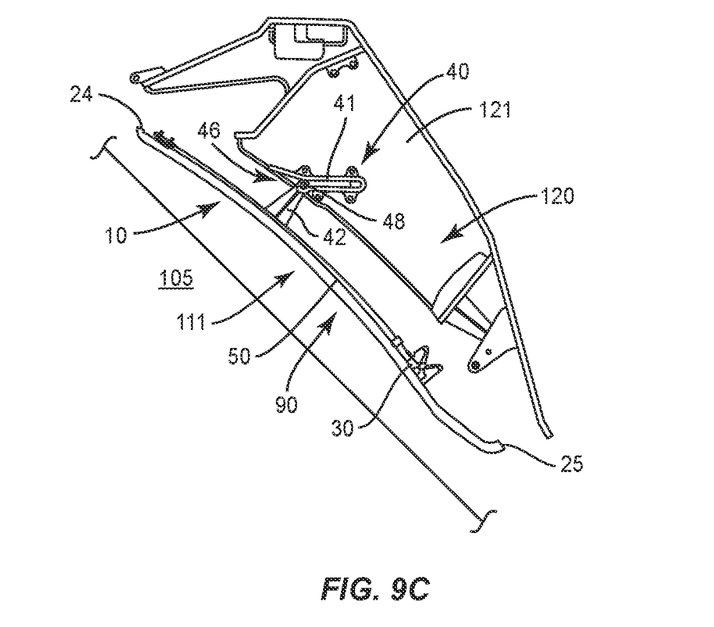

FIG. 9C illustrates a further progression with the follower 42 having moved along the track 41 towards the open end 46. In one example, the head 48 is positioned in the detent 49 on the track 41 to prevent the inadvertent disconnect of the panel assembly 10 from the overhead support structure 121. The panel 20 moves within the access space 111 and remains spaced away from the monument wall 105. Further, a user is able to pivot the panel 20 about the head 48. This pivoting and translational movement of the panel 20 can provide the user with access to the closeout area 120 that is formed within the overhead support structure 121.

Figure 9D:
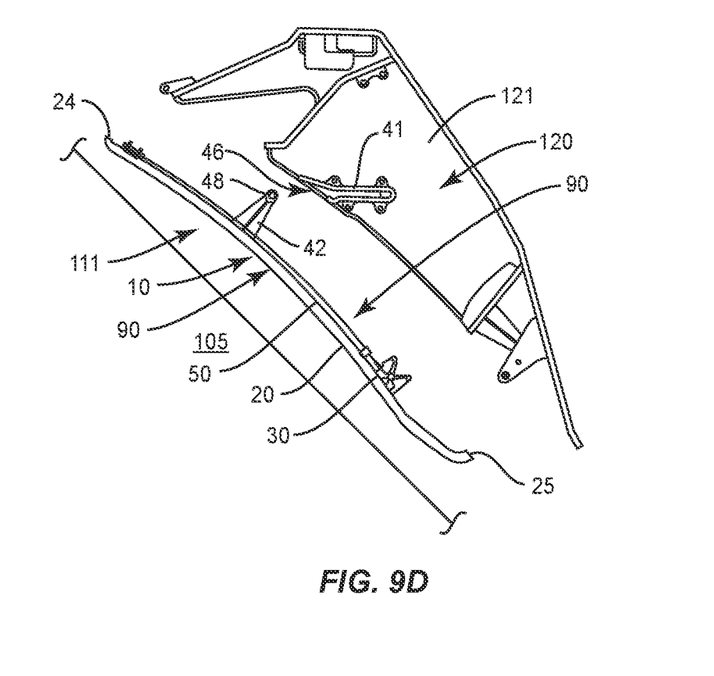

FIG. 9D illustrates the panel assembly 10 fully disconnected from the overhead support structure 121. The head 48 of the follower 42 has moved through the open end 46 and out of the track 41. The panel assembly 10 can be manipulated by the user within the area above the monument wall 105 and removed from the area to allow the user to access the closeout area 120.

In one example, a single latch assembly 90 provides for connecting and disconnecting the panel assembly 10 from the overhead support structure 121. In another example, a second latch assembly 90 is mounted on the opposing side of the panel 20 and overhead support structure 121. The first and second latch assemblies 90 are spaced apart across the panel 20 to provide for stability and facilitate movement of the panel assembly 10 relative to the overhead support structure 121.

In one example, one or more lanyards can extend between and connect the panel 20 to the overhead support structure 121. The lanyards include a first end connected to the panel 20 and a second end connected to the overhead support structure 121. The lanyards prevent the panel 20 from falling once the panel 20 is disconnected from the overhead support structure 121.

Connecting the panel 20 to the overhead support structure 121 basically includes reversing this process. Initially, the panel 20 is moved into the access space 111. The head 48 is aligned with the open end 46 of the track 41. Once aligned, the head 48 is moved into the track 41 and into engagement with the one or more rails 43. Once in the track 41, the panel is connected to and supported by the overhead support structure 121. The panel 20 is further translating along the overhead support structure 121 with the head 48 moving along the track 41. The movement of the head 48 into the track 41 aligns the latch 30 with the strike member 122. Once aligned, the latch 30 is brought into engagement with and locked onto the strike member 122 to fully connect the panel 20 to the overhead support structure 121.

Figure 10:
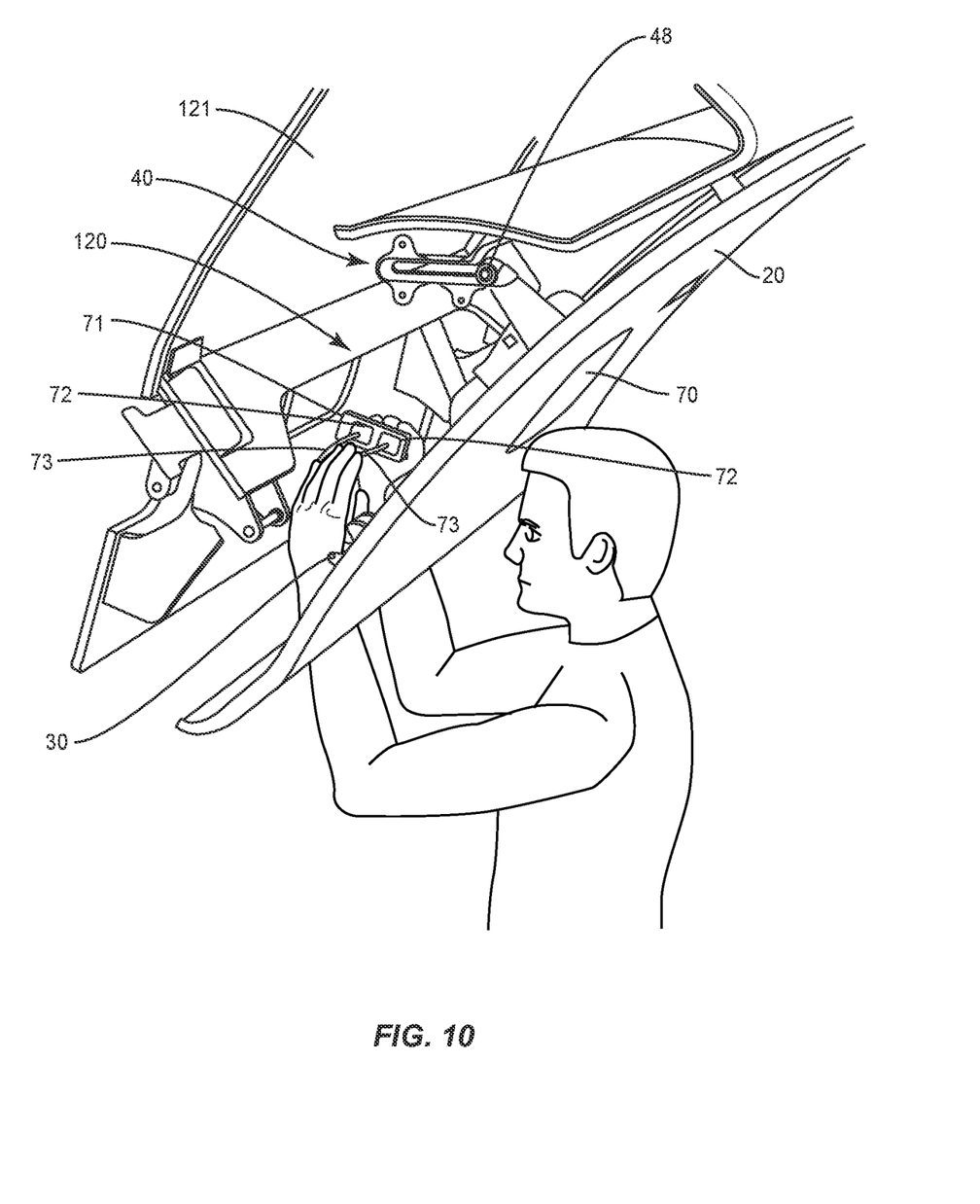
FIG. 10 is a side perspective view of a technician access a PSU component in an access space.

FIG. 10 illustrates an example of a technician working in the closeout area 120 that is formed behind the panel 20. The panel 20 is disconnected at the latch 30 and remains connected to the overhead support structure 121 through the translating assembly 40. This provides for the panel 20 to be supported allowing the technician to work with both hands in the closeout area 120. The technician can also pivot the panel about the head 48 of the translating assembly 40. In one example, a pair of latches 30 and a pair of translating assemblies 40 are included with the panel 20. Other examples can include different numbers of both latches 30 and translating assemblies.

In one example, a bracket 71 is positioned in the closeout area 120. The bracket 71 includes one or more sockets 72 configured to engage with one or more leads 73 that extend from the panel 20. In one example, the leads 73 are electrical wires that provide power to the PSU component 70 mounted to the panel 20. The leads 73 can include plugs at the distal ends that are configured to engage with the sockets 72. Further, the plugs and sockets 72 can be configured for a technician to connect and disconnect as needed without visibly observing the work. In another example, the leads 73 are audio connections to a speaker 70 mounted to the panel 20. During work, the technician can reach behind the panel 20 and access the bracket 71 and one or more sockets 72 and leads 73 during work on the PSU component 70.

The one or more brackets 71 are positioned on the overhead support structure 121 to be accessible while the panel 20 remains attached to the overhead support structure 121. In one example as illustrated in FIG. 10, the bracket 71 faces laterally and is accessible to the technician. In another example, the one or more brackets 71 are mounted on the back side 22 of the panel 20 and the one or more leads 73 extend from the overhead support structure 121.

Figure 11:
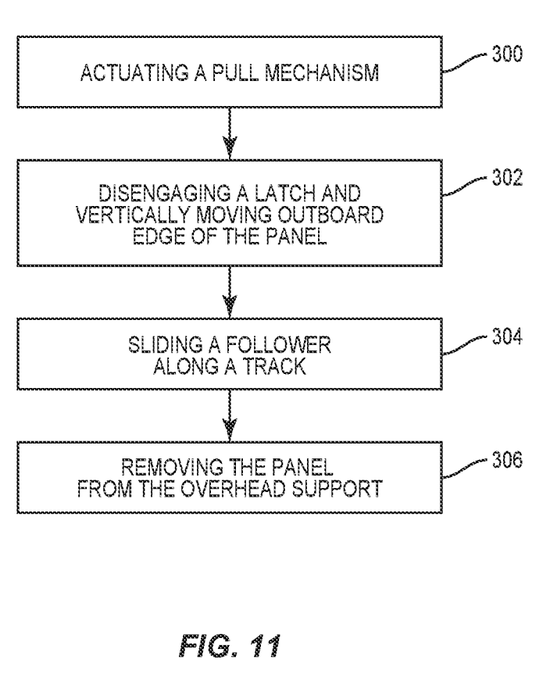
FIG. 11 is a flowchart diagram of a method of removing a panel from an overhead support structure.

FIG. 11 illustrates a method of removing a panel 20 from an overhead support structure 121 within an interior 102 of a vehicle 100. The method includes actuating a pull mechanism 50 that extends along a back side 22 of the panel 20 (block 300). The actuation disengages a latch 30 on the panel 20 that is connected to the overhead support structure 121 and provides for vertically moving an outboard edge 25 of the panel 20 downward away from the overhead support structure 121 (block 302). The method includes maintaining the panel 20 attached to the overhead support structure 121 and sliding a follower 42 along a track 41 and sliding the panel 20 relative to the overhead support structure 121 (block 304). The method further includes sliding the follower 42 out of the track 41 and thereby removing the panel 20 from the overhead support structure 121 (block 306).

In one example, maintenance work is performed on the components in the closeout area 120 which the panel 20 is partially connected to the overhead support structure 121 through the translating assembly 40 as illustrated in FIG. 9C. In this position, the panel 20 is positioned outward away from the front of the overhead support structure 121. This allows for a technician to reach around the panel and access the closeout area 120. Further, the technician can pivot the panel 20 about the head 48 to further facilitate access into the closeout area 120. This provides for the panel 20 to be supported by the overhead support structure 121 thus facilitating the access by the technician. In one example, the head 48 of the follower 42 is positioned in the detent 49 to further hold the position of the panel 20 and prevent inadvertent removal from the overhead support structure 121.

The assembly 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

In one example as described above, the assembly 10 includes a monument wall 105. In other examples, the assembly 10 does not include the monument wall 105 and includes the panel 20 and one or more latch assemblies 90 that connect the panel 20 to the overhead support structure 121.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly for an interior of a vehicle, the assembly comprising:
a panel configured to mount to an overhead support structure adjacent to a monument wall within the interior of the vehicle, the panel comprising a front side configured to face into the interior of the vehicle, a back side, and a perimeter edge that extends between the front and back sides;
one or more latch assemblies configured to connect the panel to the overhead support structure above the monument wall, the latch assemblies comprising:
a strike member configured to be mounted to the overhead support structure;
a latch mounted to the back side of the panel, the latch comprising a pair of jaws that are movable between a locked position that engage with the strike member and an unlocked position;
a track configured to be mounted to the overhead support structure, the track comprising one or more rails with an elongated shape and with a closed end and an open end with the open end facing away from the strike member;
a follower mounted to the back side of the panel, the follower comprising an arm and a head with the head sized to engage with the track; and
a pull mechanism mounted to the back side of the panel and comprising an elongated shape with a first end connected to the latch and a second end positioned in proximity to the perimeter edge of the panel;
the one or more rails of the track aligned to remain engaged with the follower when the latch is in the unlocked position to maintain the panel connected to the overhead support structure when the panel is moved relative to the overhead support structure as the follower translates along the track from the closed end to the open end and the strike member moves away from the latch.

2. The assembly of claim 1, wherein the latch is positioned in proximity to an outboard edge of the panel and the second end of the pull mechanism is positioned in proximity to an inboard edge of the panel.

3. The assembly of claim 1, wherein the latch is positioned on the back side of the panel between the follower and an outboard edge of the panel.

4. The assembly of claim 1, wherein the panel further comprises a speaker mounted in a central section within the perimeter edge and is exposed on the front side.

5. An assembly for an interior of a vehicle, the assembly comprising:
a panel configured to be mounted to an overhead support structure above a monument wall that is mounted within the interior of the vehicle, the panel comprising a front side configured to face into the interior of the vehicle, a back side, a first edge and a second edge with each of the first and second edges extending between the front and back sides;
one or more latch assemblies configured to connect the panel to the overhead support structure, the latch assemblies comprising:
a latch mounted to the back side of the panel;
a translating assembly comprising a track and a follower with the track comprising a closed end and an open end and with the follower configured to engage with the track;

a pull mechanism mounted to the back side of the panel between the latch and the first edge and configured to move the latch from a locked position to an unlocked position;

the one or more latch assemblies configured to unlock the latch and for the follower to translate along the track towards the open end and for the latch to move towards the track to slide the panel within an access space formed between the monument wall and the overhead support structure.

6. The assembly of claim 5, wherein the track is configured to connect to one of the panel and the overhead support structure and the follower is configured to connect to the other of the panel and the overhead support structure, the follower sized to remain engaged with the track to maintain the panel connected to the overhead support structure after the latch is released from the overhead support structure.

7. The assembly of claim 6, wherein the track comprises first and second rails that are spaced apart to form a slot with the closed end and the open end and with the follower comprising a head sized to fit into the slot with the closed end configured to be positioned towards the latch when the latch is locked and with the open end facing away from the latch.

8. The assembly of claim 7, further comprising a recessed catch detent in one of the first and second rails and positioned in proximity to an open end of the track, the catch detent sized to engage with the head of the follower.

9. The assembly of claim 5, wherein the latch is mounted to the panel in closer proximity to the second edge than the translating assembly.

10. The assembly of claim 5, wherein the panel further comprises:
an opening;
one of a speaker and an emergency air unit mounted at the opening.

11. The assembly of claim 5, wherein an access space is formed between the monument wall and the panel with the access space comprising a height that is less than half a height of the panel.

12. A method of removing a panel from an overhead support structure that is positioned above a monument wall within an interior of a vehicle, the method comprising:
actuating a pull mechanism that extends along a back side of the panel;
disengaging a latch on the panel that is connected to the overhead support structure and vertically moving the latch downward away from the overhead support structure and towards the monument wall;
maintaining the panel attached to the overhead support structure after disengaging the latch and sliding a follower along a track and sliding the panel relative to the overhead support structure within an access area formed between the overhead support structure and the monument wall and with latch moving towards the track as the follower slides along the track; and
sliding the follower out of the track and thereby removing the panel from the overhead support structure.

13. The method of claim 12, further comprising while the latch is disengaged and the panel is attached to the overhead support structure through the follower within the track, spacing the panel away from a front of the overhead support structure and accessing a closeout area formed within the overhead support structure.

14. The method of claim 13, further comprising maintaining the orientation of the panel relative to the overhead support structure while sliding the panel within the access area.

15. The method of claim 12, further comprising vertically moving the edge of the panel vertically downward away from the overhead support structure while a first section of the panel that is spaced away from the edge remains attached to the overhead support structure.

16. The method of claim 12, further comprising disengaging the latch and pivoting the panel about the follower.

17. The method of claim 12, further comprising after disengaging the latch and while the panel remains attached to the overhead support structure through the follower and track, accessing a personal services device that is mounted on a back side of the panel.

18. The method of claim 12, further comprising maintaining the panel spaced away from the monument wall while sliding the follower along and out of the track.

19. The method of claim 12, wherein actuating the pull mechanism comprises pulling a handle of the pull mechanism away from the edge of the panel and disengaging the latch.

20. The method of claim 12, further comprising engaging the panel to the overhead support structure with at least two of the latches.

* * * * *